United States Patent

[11] 3,616,967

| [72] | Inventors | Martin Mueller;<br>Bernard Zurhoefer, both of Chicago, Ill. |
|---|---|---|
| [21] | Appl. No. | 889,783 |
| [22] | Filed | Dec. 12, 1969 |
| [23] | | Division of Ser. No. 677,098, Oct. 23, 1967,<br>Pat. No. 3,526,075 |
| [45] | Patented | Nov. 2, 1971 |
| [73] | Assignee | Owens-Illinois, Inc.<br>Toledo, Ohio |

[54] ARTICLE TRANSFER DEVICE
7 Claims, 17 Drawing Figs.

[52] U.S. Cl. .................................................. 221/188
[51] Int. Cl. .................................................. G07f 11/46
[50] Field of Search .......................................... 221/188,
298, 251, 223, 241, 242

[56] References Cited
UNITED STATES PATENTS
1,582,451  4/1926  Cooley ........................ 221/188
2,946,480  7/1960  Farber ......................... 221/242 X

*Primary Examiner*—Stanley H. Tollberg
*Attorney*—Dressler, Goldsmith, Clement & Gordon ABSTRACT: An apparatus for depositing side-by-side containers on a conveyor including a tilt mechanism journaled on a support frame and having side-by-side chutes for receiving articles therein. A gate normally blocks the article outlet ends of the chutes, and when the tilt mechanism is pivoted, the gates are moved to a clearance position so that the articles are free to move out of the chutes and on to the conveyor.

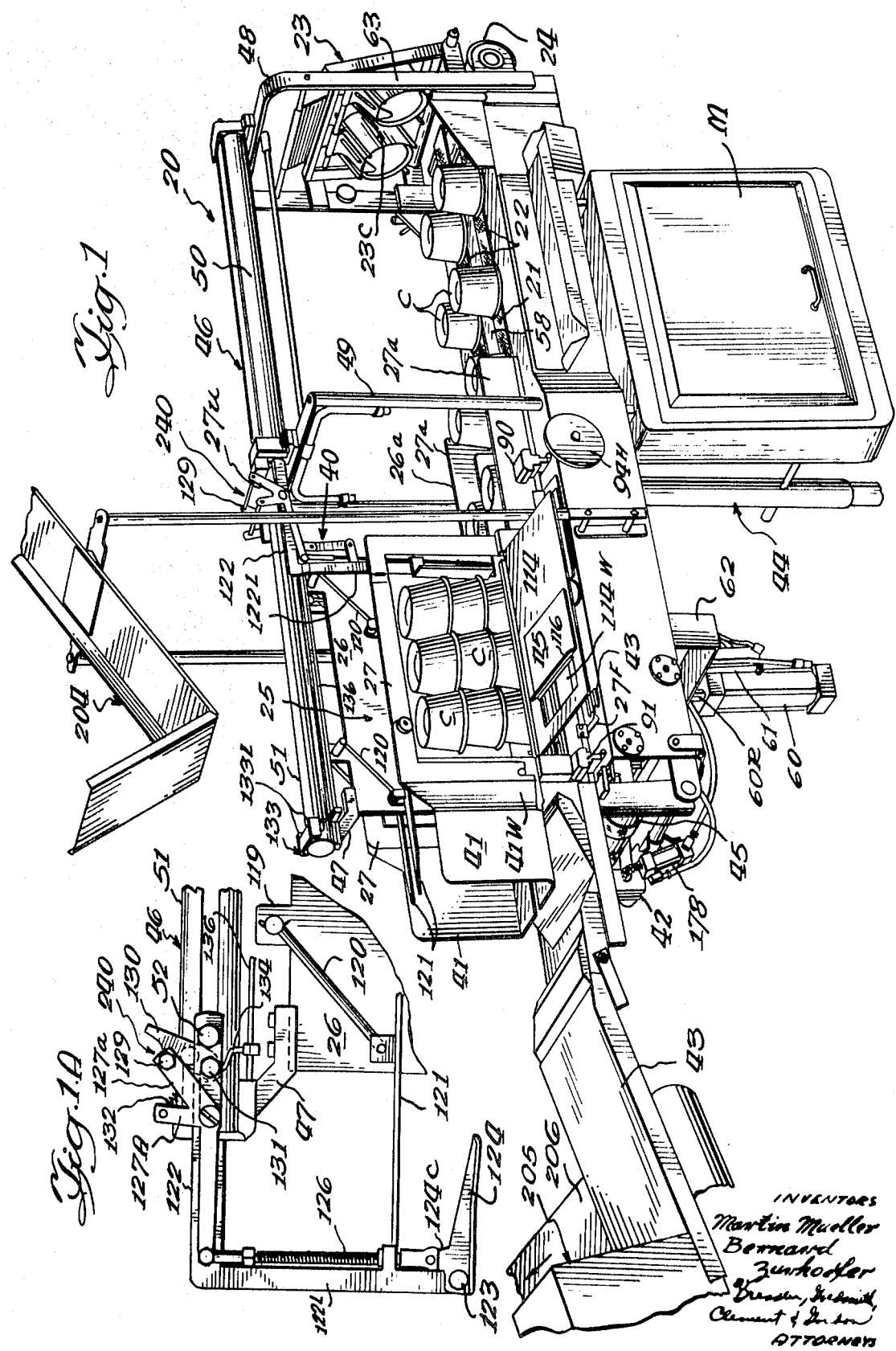

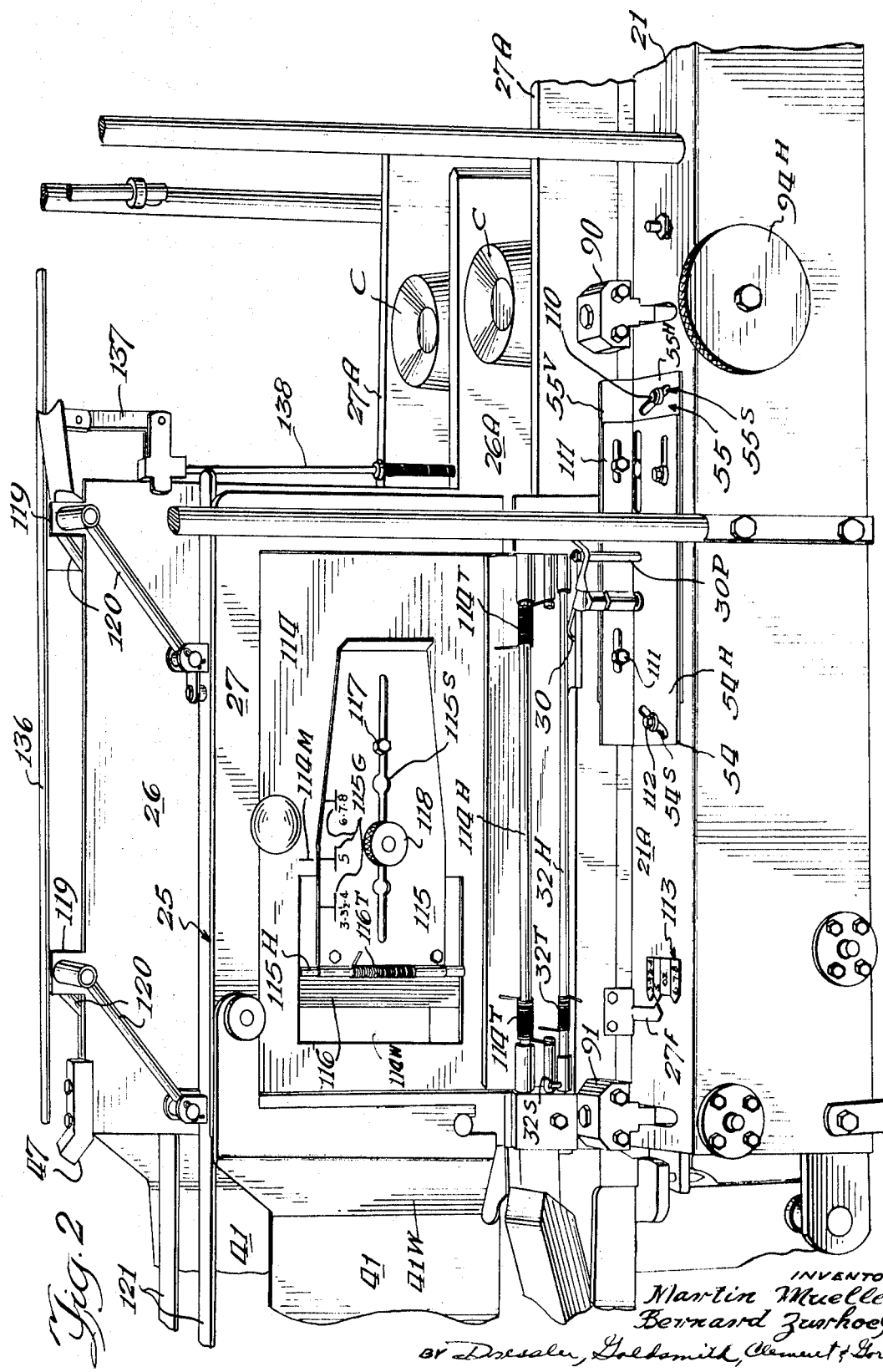

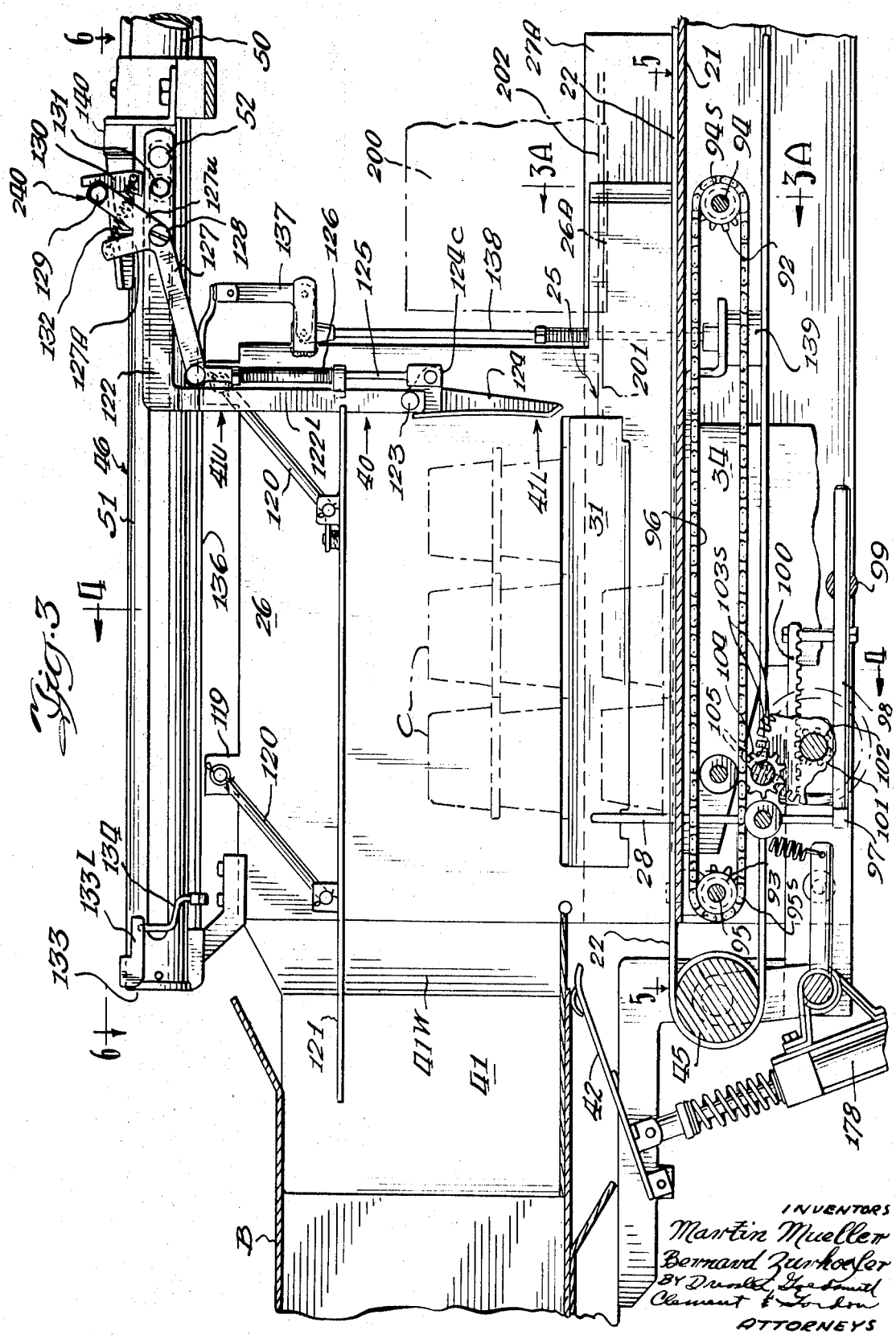

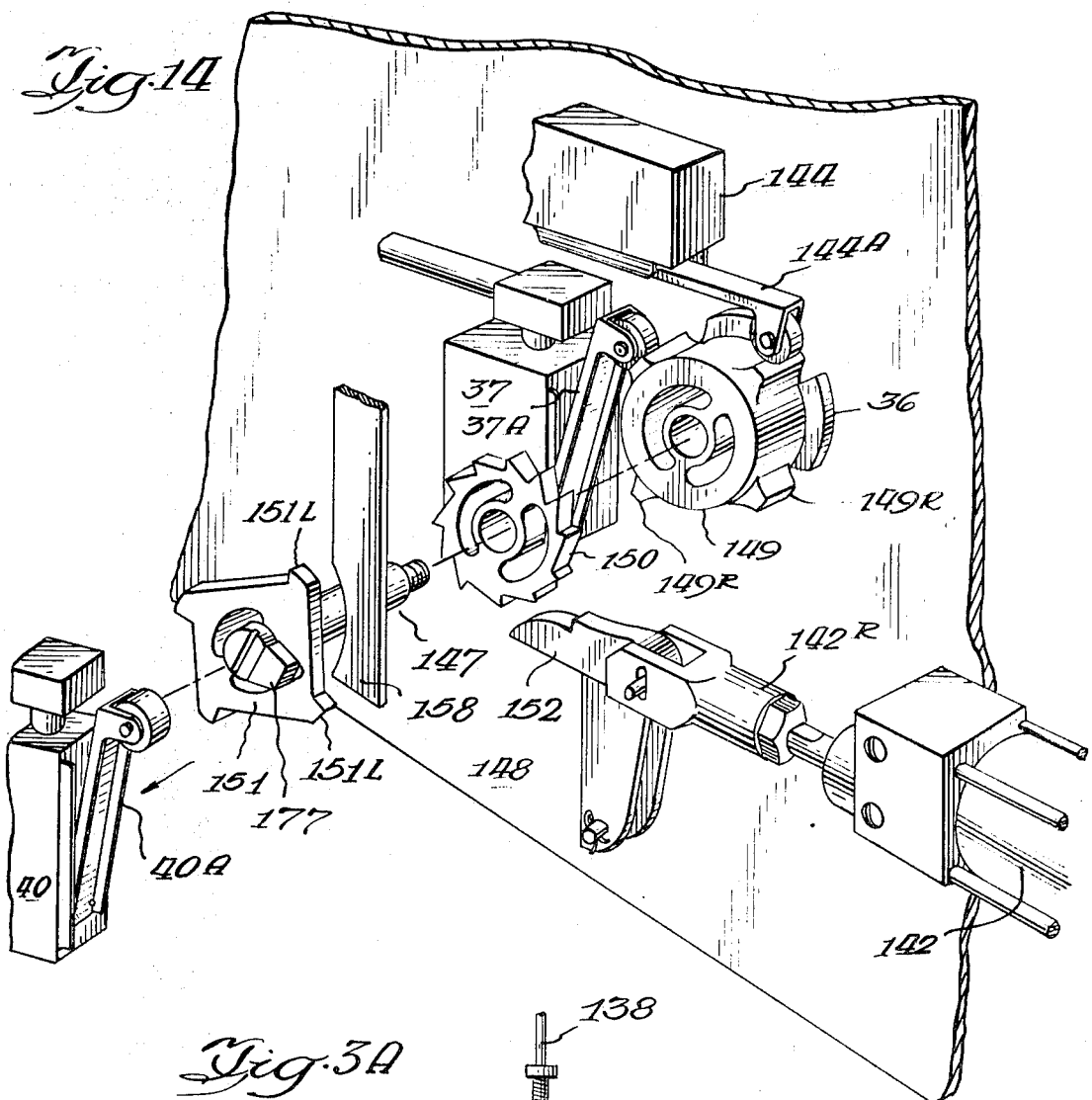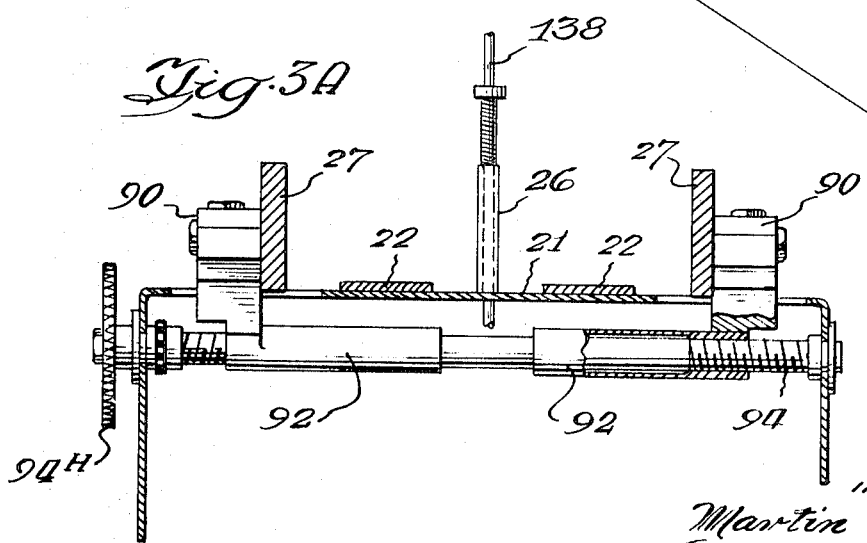

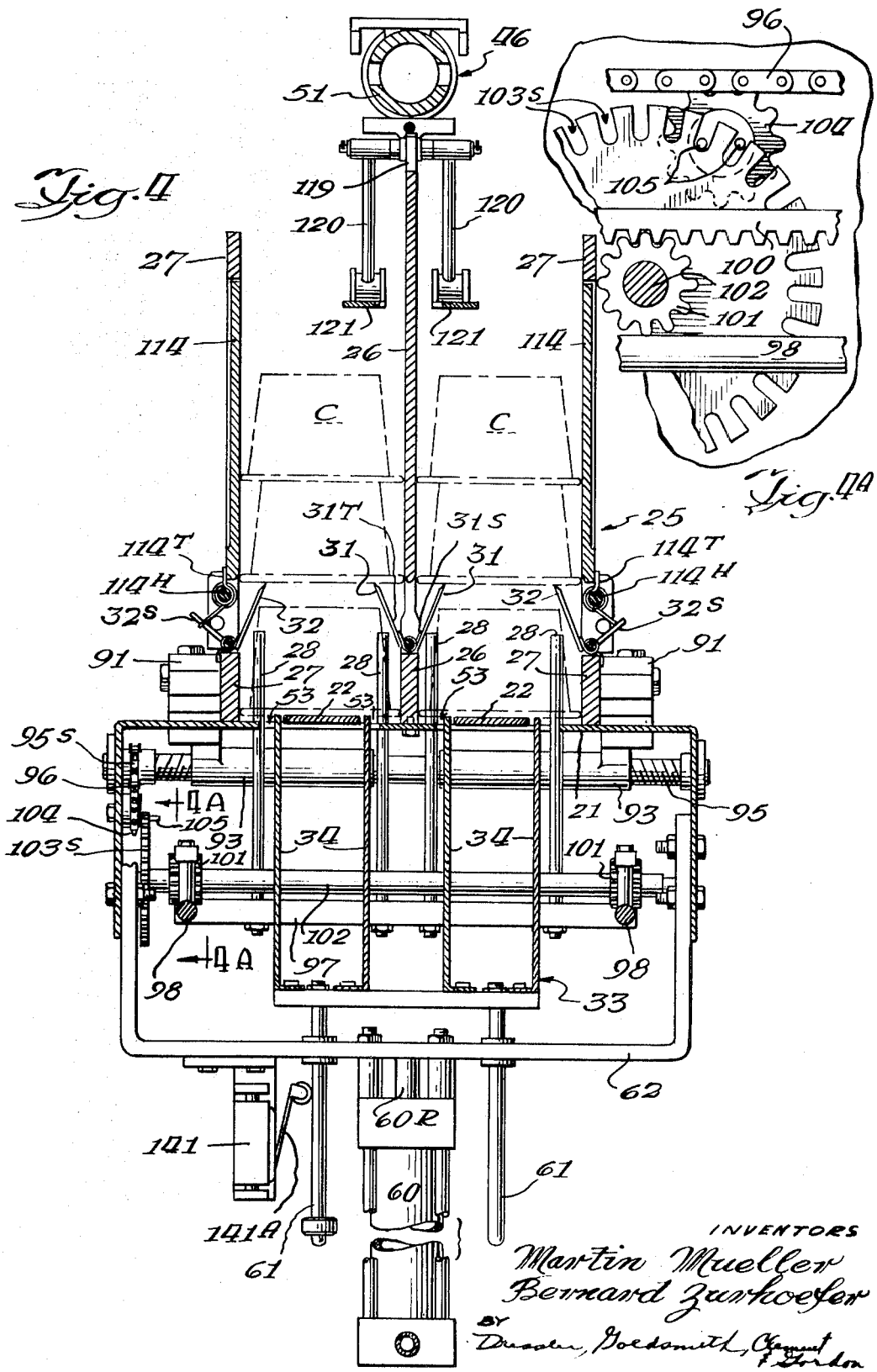

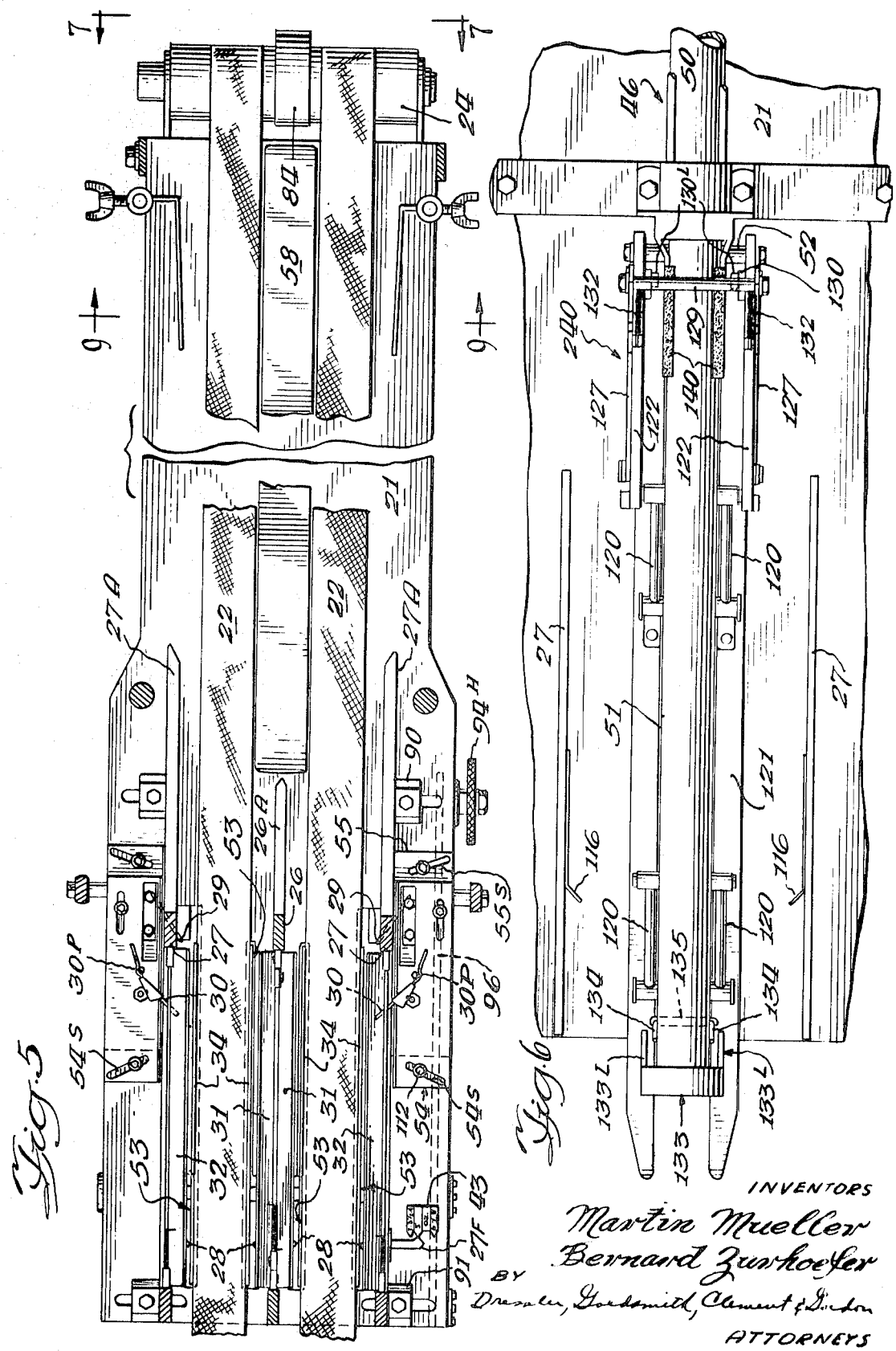

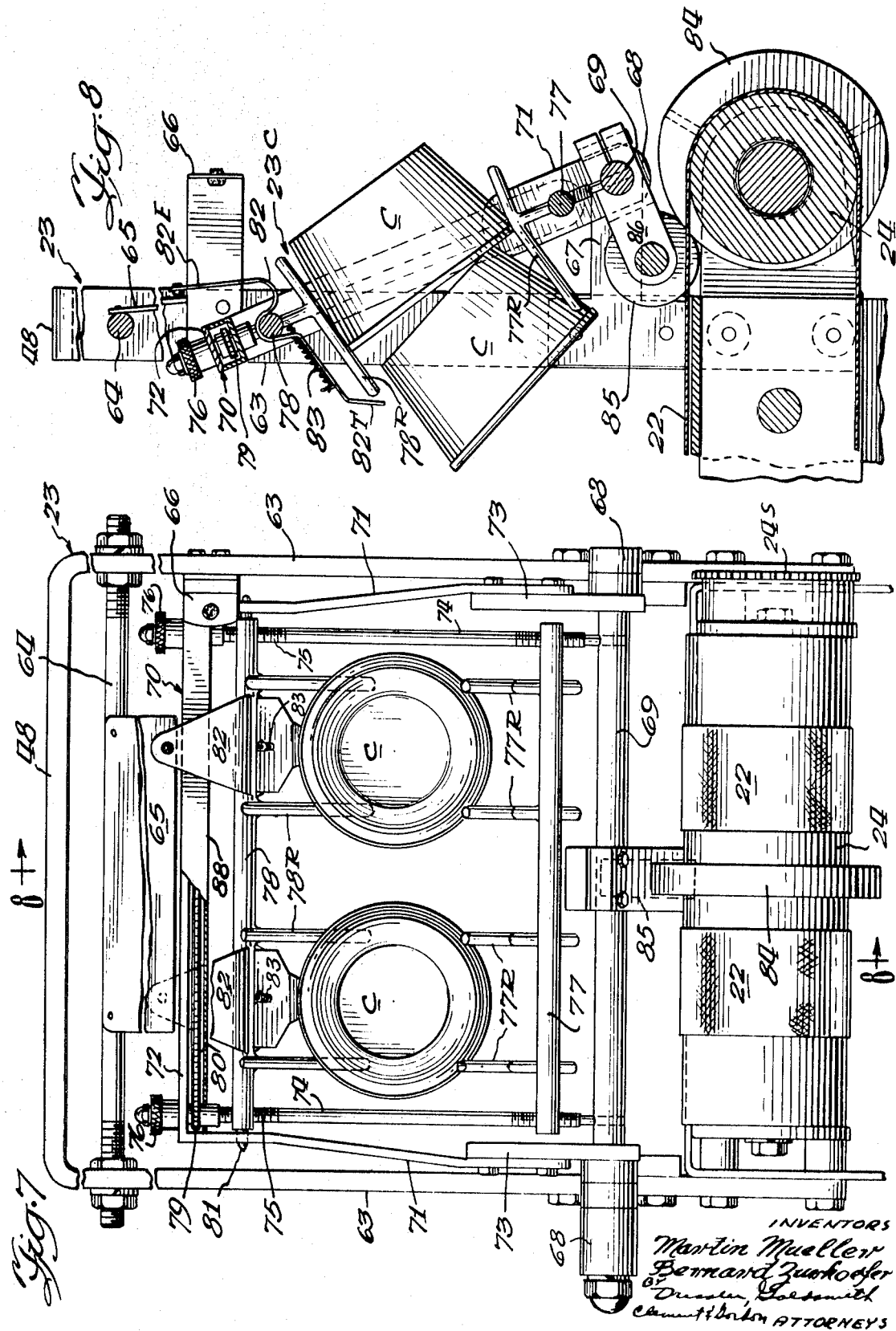

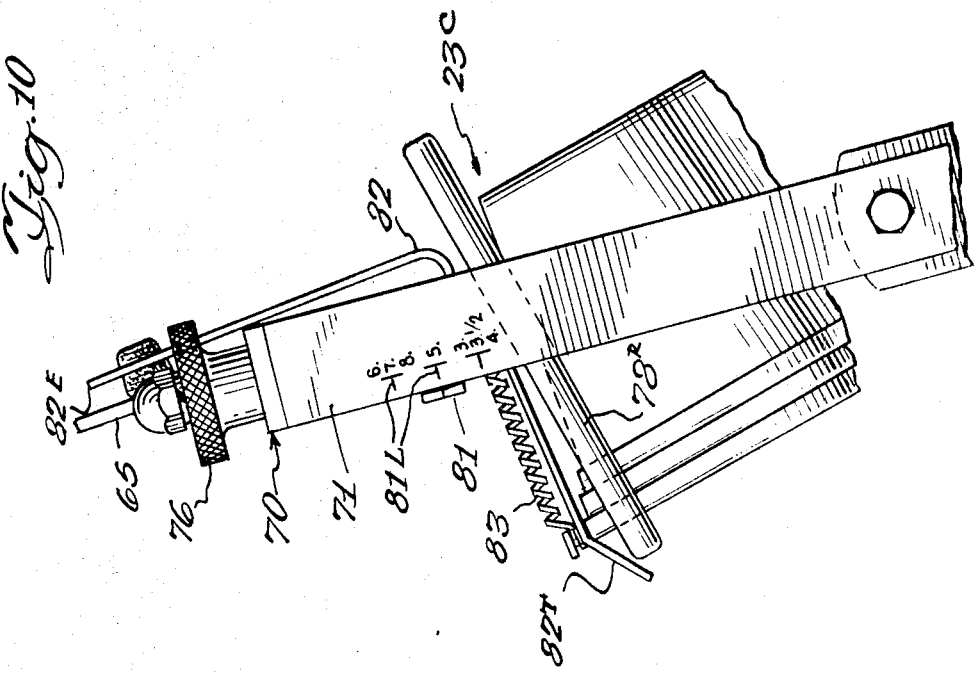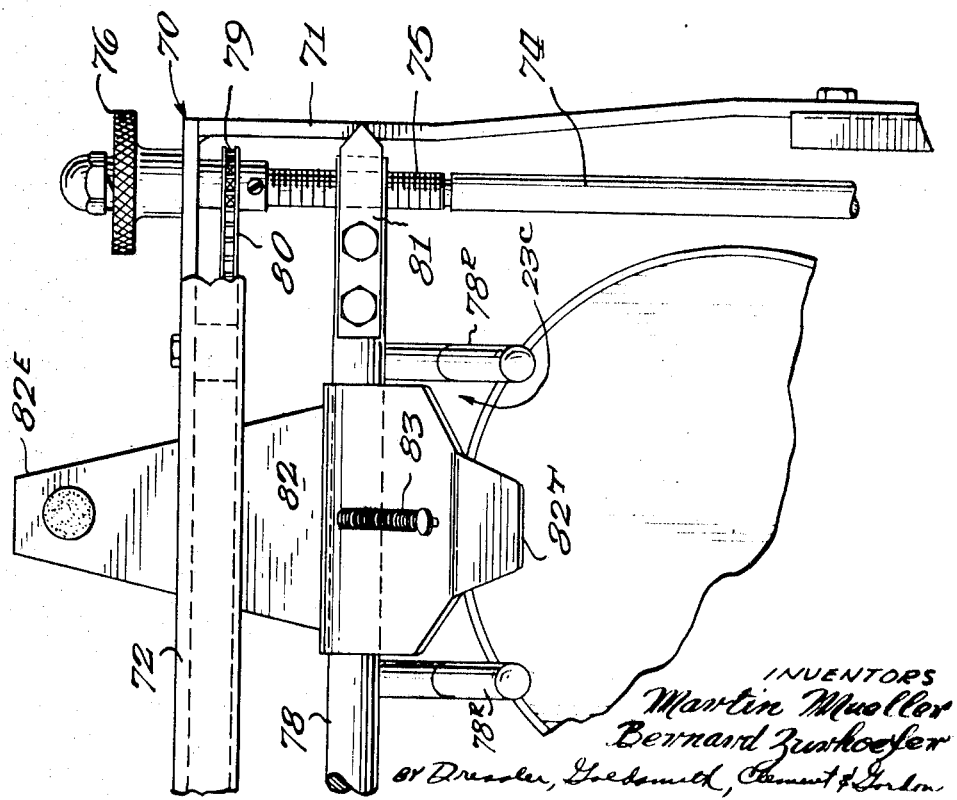

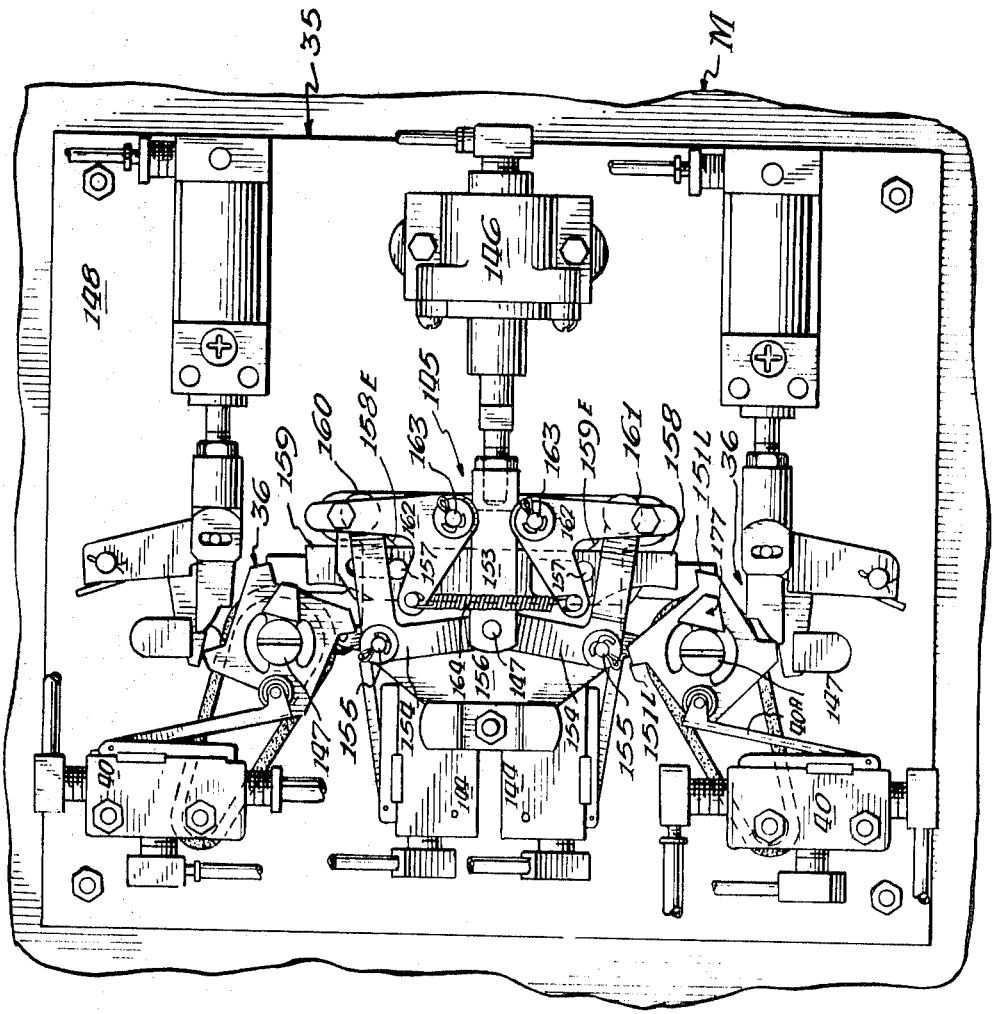

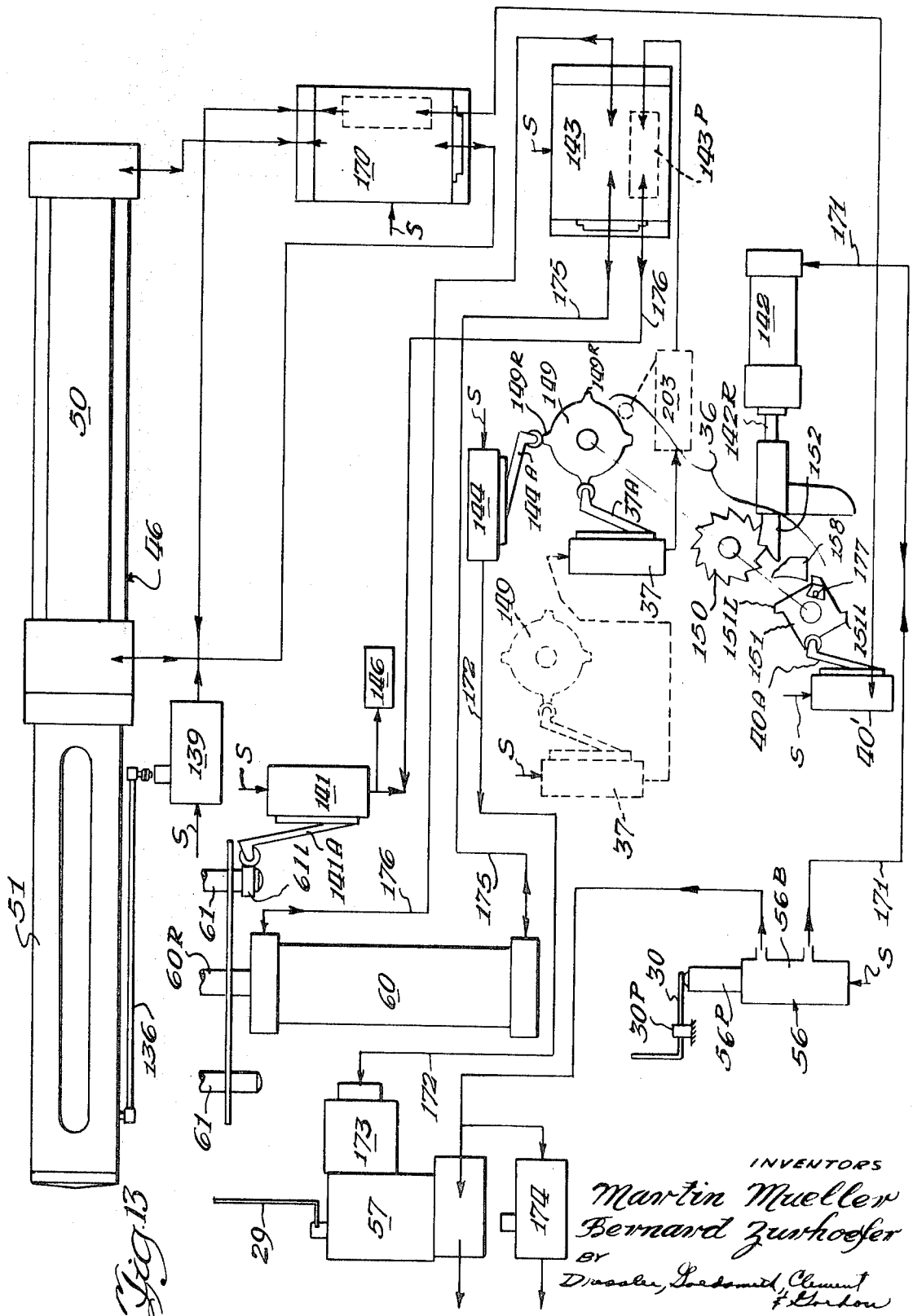

ARTICLE TRANSFER DEVICE

CROSS-REFERENCE TO RELATED APPLICATIONS

This application is a divisional application of applicants' copending application, Ser. No. 677,098, filed Oct. 23, 1967 now Pat. No. 3,526,075.

BACKGROUND OF THE INVENTION

In the ice cream packing field, the ice cream is soft when packed and the usual containers are not intended for rough handling. Sanitation requirements are strict and make problems of spillage severe It is customary in the case of ice cream cups to ship the same in rectangular cartons that are arranged to hold an array of vertical and horizontal rows of cups.

Because of the delicate handling requirements and the dangers of spillage, it has been usual to package the cups in the cartons by hand but this is a slow and expensive procedure.

SUMMARY OF THE INVENTION

The present invention provides a method of handling individually fed articles of uniform size including accumulating the articles into a horizontal row, elevating and temporarily supporting the row, accumulating a second horizontal row that duplicates the first, elevating the second row to lift the first row in stacked relation and temporarily supporting the second row, continuing the row accumulating and elevating until a stacked array of predetermined size is complete and discharging the array endwise into a packing box or carton.

In the case of ice cream cups where the cartons normally receive side-by-side arrayed vertical tiers, the method provides for sequencing the formation of horizontal rows in side-by-side relation, elevating the side-by-side rows simultaneously, continuing the procedure until side-by-side vertical tiers are completed simultaneously and then discharging all of the tiers endwise and simultaneously.

According to the invention, a collating apparatus is provided with a conveyor that feeds articles individually to an accumulator station where a prescribed number of articles are aligned, counted and segregated to form a distinct horizontal row. An elevator lifts the row through elevated support gates which separate to admit the row and restore to accept support of the row when the elevator descends, a duplicate horizontal row is formed and elevated through the gates to accept support of the first row in stacked relationship and, in turn, to seat on the support gates when the elevator descends, and a pusher discharges the array endwise when a prescribed number of tiers of horizontal rows are disposed on the support gates.

A depositer is arranged to receive articles from a loader and deposit them individually upon the conveyor. In the case of ice cream cups, the depositor places them in inverted position upon the conveyor to use the larger diameter top end as a support and as a locator.

The conveyor has a continuously running feed belt leading from the depositor and extending through the accumulator station and having a slip-type feed surface of less width than the articles so that the articles are normally urged into adjacent abutting engagement by the belt while allowing the articles to be stopped to stand on the free running belt.

The accumulator station has a storage compartment provided with a row forming stop to intercept the load article while succeeding articles accumulate in aligned abutting engagement. A counting finger senses the arrival of each article at the accumulator storage compartment and a row isolating stop is operated after a full row is counted for thereafter blocking arrival of additional articles while the first row is elevated and stored.

A multiple belt system feeds articles to a multiple compartment accumulator simultaneously, each compartment having a stop and sensing arrangement controlling a separate totalizing counter.

A control system incorporates the separate totalizing counters and includes an interlock to allow actuation of the elevator only after each compartment has a full row and a sequencing mechanism to deactuate the counters until the first rows have been elevated.

A pusher carriage is operated by the totalizing counters after a prescribed number of rows have been stacked in tiered relation on the support gates, the carriage simultaneously discharging the vertical tiers endwise.

The collator machine of this invention is extremely versatile as the same basic unit can be converted for use with articles of difference size and shape. In the case of ice cream cups, which come in frustoconical cylindrical form, the cups have as many as 10 different sizes based upon several different diameter dimensions and several different height dimensions. Both the length of a row and the width are dependent upon the cup diameter and the height of each tier of rows is dependent upon the cup height.

The accumulator station is provided with vertical partition walls flanking each belt and defining the storage compartments. Provision is made for adjusting the lateral spacing of the partition walls to adapt the storage compartments to different diameter cups. Provision is made for adjusting the row forming stops endwise and the counting finger and row isolating stops both endwise and laterally in conjunction with the lateral positioning of the partition walls. All these adjustments are accomplished from a single control at the accumulator station.

Height variations are accommodated without any adjustment by establishing the support gates at an elevation to allow for the tallest cup to be handled and by providing a floating top guide that is to engage the top row of cups.

Size adjustments are also provided in the depositor.

Although the principles of the present invention are broadly applicable to the packaging of products normally shipped in cartons and packed in vertical and horizontal rows, such as cylindrical and rectangular containers for edibles and nonedibles alike, as well as other commercial items such as glassware, etc., the present invention is particularly adapted for use in conjunction with tapered cylindrical containers and hence is so illustrated and described herein.

DESCRIPTION OF THE DRAWINGS

In the accompanying drawings forming a part of the specification, and in which like numerals are employed to designate like parts throughout the same.

FIG. 1 is a generalized perspective view of the collator machine;

FIG. 1A is a fragmentary detail elevational view;

FIG. 2 is an enlarged perspective and side elevational view of the accumulator station of the collator machine;

FIG. 3 is an enlarged vertical section through a storage compartment region of the accumulator station;

FIG. 3A is a fragmentary transverse section taken as indicated on the line 3A—3A of FIG. 3 and appearing on the same sheet with FIG. 14;

FIG. 4 is an enlarged transverse sectional view through the accumulator station and is taken on the line 4—4 of FIG. 3;

FIG. 4A is a fragmentary detail view taken on the line 4A—4A of FIG. 4;

FIG. 5 is a plan sectional view showing the conveyor bed plate region of the machine and is taken as indicated on the line 5—5 of FIG. 4;

FIG. 6 is a fragmentary plan elevational view taken as indicated on the line 6—6 of FIG. 4;

FIG. 7 is a front end elevational view of the depositor mechanism at the entrance end of the packaging machine and is taken approximately as indicated on the line 7—7 of FIG. 5;

FIG. 8 is a staggered transverse sectional view of the depositor and is taken approximately on the line 8—8 of FIG. 7;

FIG. 9 is an enlarged fragmentary rear end view of the depositor taken approximately as indicated on the line 9—9 of FIG. 5 to show its size adjustment mechanism, with parts broken away and sectioned;

FIG. 10 is an enlarges fragmentary side elevational view of the depositor;

FIG. 11 is a side elevational view of the mechanical layout of the control module;

FIG. 12 is an end elevational view of the control module;

FIG. 13 is a schematic of the pneumatic control circuit for counting, accumulating, elevating and discharging the articles;

FIG. 14 is an exploded fragmentary perspective view of a counter assembly mounted in the control module and incorporated in the control circuit of FIG. 13.

GENERAL DESCRIPTION

The packaging system is here disclosed in connection with the packaging of filled and scaled ice cream cups C which are delivered intermittently and in pairs from a loader machine (not shown) that fills and seals the cups to a collator machine 20 that automatically accumulates and stores the cups to form an array of 24 cups and then discharges the array into a carton or packing box B. The 24-cup array is comprised of two vertically tiered groups of rows, each group being four rows high and having three cups per row. The cups C, as illustrated here, are of a familiar frustoconical shape and have a flat bottom of smaller diameter than the top, these cups all being handled in an inverted relationship in the collator machine so that all positioning stops and sensing elements may key against the cover on the large diameter top end of each cup.

In the case of ice cream packaging, the ice cream is soft at the time the cups are filled, sealed and delivered from the loader machine to the collator machine and it is required to provide sensing and positioning equipment to handle the cups in a fashion so that crushing of the cups or puncturing of the cups is avoided. An entirely pneumatic system completely free of any electrical components or power is used in the collator machine to permit complete washdown of the unit without damaging or otherwise impairing operation of the sensitive components. Industry sanitation requirements make regular cleaning operations necessary. In addition, the soft condition of the ice cream makes spillage of the cup contents possible in the event the loader delivers cups that are not properly sealed or in the vent of operator error or some other uncontrollable cause.

As shown in FIGS. 1, 4 and 5, the collator machine incorporates a substantially flat elongated bed plate 21 that supports a pair of side-by-side located continuously running rubber belts 22, each having a smooth low friction surface to permit temporarily blocking cup movement so that the blocked cups stand in free slipping relation on the belt without interfering with normal belt travel and without causing any damage to the blocked cups.

A twin chute depositor, designated generally at 23 and shown in detail in FIGS. 7 to 10, overhangs the entry end of the belts 22 above a belt drive shaft 24 which is mechanically powered from the loader machine. The loader machine has a discharge conveyor (not shown) operating from a geneva drive (not shown) to deliver cups in intermittent timed relation, the cups being pushed into the twin chutes 23C of the depositor and delivered to the belts 22 in inverted position.

An accumulator station 25 is provided at the delivery end of the conveyor belts 22 and it includes a center partition 26 flanked by side-by-side located outer partition walls 27 defining a pair of side-by-side storage compartments, one for each belt path, where each belt delivers and accumulates a row of three cups in adjacent abutting single file relation.

Lengthwise spaced stop mechanisms 28, 29 are provided for defining an accumulator position in the bottom of each storage compartment and are positioned to flank the belt travel path to engage overhanging portions of the cups. The belts 22 have a width dimension substantially less than the top diameter of the smallest cup to be handled so that the cups overhang laterally in relation to the belts sufficiently to be contacted by the stops 28, 29 and the counting finger 30. Row forming and positioning is determined by the stop mechanism 28 at the remote end of each accumulator position. Row isolation is effected by the stop mechanism 29 at the front end of each accumulator position under the control of a counting finger 30 that flanks each belt 22 and responds to each cup as it enters the accumulator. After three cups are counted, signifying a complete row has been accumulated, the stop mechanism 29 blocks the succeeding cups and maintains a clearance space with respect to the last cup in the row.

The accumulator station 25 includes hingedly mounted horizontally elongated elevated support gates 31, 32 (see FIGS. 4 and 5) carried by the partitions 26, 27 and arranged in paired relation to define a temporary row support position above the row accumulating position defined between the stops 28, 29. The elevated row support position is spaced above the accumulator position a distance greater than the height of the articles. The support gates 31, 32 are yieldably swingable towards vertical position alongside the partitions to permit a row of cups to be moved upwardly therethrough, the gates being biased normally to assume an obliquely converging relation capable of temporarily supporting the elevated row of cups in underneath engagement therewith.

An elevator 33 (FIG. 4) is positioned beneath the accumulator station and includes a set of four vertical walls 34 arranged in pairs immediately flanking the conveyor belts 22 to underlie the overhanging cup portions and move upwardly between the accumulator partitions and lift the two rows of three cups through the support gates 31, 32 with the support gates thereafter swinging beneath the elevated cups to hold the two rows of three cups after the elevator descends.

The stop mechanism 29 is retracted upon the return of the elevator so that additional cups may enter the accumulator compartment when the elevator walls 34 clear the belt travel path. Thus, another row of three cups is advanced, counted and isolated at each accumulator position and then the stop mechanism 29 operates to block the succeeding cups. When both rows of three are full, the elevator 33 operates to lift the next two rows of cups through the support gates so that the first two rows are supported in vertically tiered relation on the second set of rows which is then supported by the gates 31, 32. This sequence continues until a tier four rows high with three cups to a row is supported upon the support gates 31, 32 above each conveyor belt 22.

A control unit 35 (see FIGS. 11 to 14) for counting each cup on each belt includes a separate totalizing counter 36 associated with each belt, interlocked cam controlled switching valves 37 responsive to the counters 36 for actuating the elevator 33 only after both three cup rows on the belts are complete, a sequencing mechanism 38 for advancing the counters 36 beyond intermediate rest positions after each row elevating movement, the stop mechanism 29 that controls row isolation, and interlocked cam controlled switching valves 39 responsive to the counters 36 at the completion of a full cycle for actuating a pusher carriage 40.

The pusher carriage 40 (see FIGS. 1, 3 and 6) is positioned above the accumulator station and is reciprocable horizontally in a direction lengthwise of the belts 22 to shift the 24 cup array endwise directly into a packing box B positioned on outboard extension shelves 41 that are carried by the outer partitions 27 at the elevation of the support gates 31, 32. The pusher carriage has a rigid upper leg section 41U mounting a hinged lower leg section 41L to engage each endmost cup and move the group endwise to transfer the same from the support gates which furnish free sliding support for the bottom row to the shelf extension which leads directly into the box. The lower leg sections 41L swing upwardly at the end of the push stroke to permit return of the pusher carriage without delaying accumulation and counting of the first rows for the next array. The discharge paths of the two four tier groups converge as guided by the oblique guide wall portion 41W of the shelves so that these groups are in laterally abutting relation as they enter the box whereas they are separated by the thickness of the center partition wall 26 while being accumulated and stored.

A friction brake 42 operates simultaneously with the pusher carriage 40 to grip the end flap of the box against the exit shelves and hold the box stationary until the entire array of 24 cups are fully seated. Thereafter, continued movement of the pusher carriage 40 strips the box free of the brake and discharges the box down an inclined ramp 43.

A convenient set of adjustments are provided for the depositer 23 and the accumulator station 25 to enable instant conversion of the machine from handling cups of one diameter to handling cups of a different diameter. For simplicity, the support gates, as shown herein, are located high enough to clear the tallest cup for which the machine is intended so that no vertical adjustments are required. The principal adjustment is made at the accumulator station where the outer partition walls 27 are laterally shiftable in unison, either simultaneously away from the center partition 26 or simultaneously toward it. Concurrent adjustments are automatically effected for the counting finger 30 and the two stop mechanisms 28, 29.

STRUCTURAL ARRANGEMENT

The main frame 44 of the collator machine is free standing and locates the flat horizontal bed plate 21 spaced above the floor or other support surface extending in supporting relation beneath the upper run of the belts 22. The belts are trained about the power take off shaft 24 and the idler shaft 45 that are journaled at opposite ends of the bed plate 21. In the particular arrangement illustrated herein, the power takeoff shaft 24 is equipped with a sprocket 24S (FIG. 7) that is driven by a chain from the loader machine so that the operation of the machines are synchronized. The remote drive arrangement for the collator machine and the avoidance of any electrical components facilitates cleaning. The principles of the collator machine are adaptable to machines for handling other articles where cleaning is not required, in which case direct motor drives and other electrical components may be incorporated as will be apparent to those skilled in the art based upon the teachings of this disclosure.

A superstructure 46 extends lengthwise and centrally in elevated relation above the bed plate 21, it being supported at one end by a support connection 47 to the fixed central accumulator partition 26 and at the other end by a main bridge frame 48 that spans the bed plate at the depositor station. An intermediate bridge frame 49 spans the bed plate and supports the superstructure adjacent the start position of the pusher carriage 40.

The superstructure 46 incorporates a pneumatic pusher cylinder 50 at one end and has a slotted guide tube 51 at the other end to mount the pusher carriage. The piston rod (not shown) of the pusher cylinder operates within the guide tube 51 and is connected to the carriage by means of a cross bolt 52 that extends transversely of the tube.

The bed plate 21 has lengthwise pairs of slots 53 (see FIGS. 4 and 5) directly flanking the marginal edges of the belts within the accumulator station to accommodate vertical movement of the elevator walls 34. The slots 53 are wide enough to accommodate the stops 28, 29 and counting finger 30 and are long enough to accommodate lengthwise adjustment of the position of the stops 28, 29 in connection with converting the collator machine to handling different diameter cups. A pair of slidable semioverlapping mounting brackets 54, 55 are mounted outboard on each movable accumulator partition 27. The upper bracket 54 carries the counting finger 30 and counting valve assembly 56 (see FIG. 13) to control lengthwise adjustments thereof in connection with converting the collator machine for different cup diameters. The lower bracket 55 carries the row isolating stop mechanism 29 and associated stop valve assembly 57 (see FIG. 13) to control its lengthwise adjustment.

The bed plate 21 has an elongated filler strip 58 (FIGS. 1 and 5) intermediate of and lying substantially flush with the belts 22 to assist in supporting and stabilizing the cups during approach to the accumulator 25. The lateral spacing of the accumulator partitions 26, 27 is set to approximate the top diameter for the cups being handled to center the cups on the belts in a fashion to cause each cup to overhang the slots 53 on both sides of the belt to be engaged by the corresponding pair of elevator walls 34 and to be engaged by the stops 28, 29 and counting finger 30.

Each accumulator partition 26, 27 has lengthwise extending approach portions 26A, 27A serving as guide rails for aligning the cups in preparation for entry to the accumulator. It will be noted that the outer rails 27A project lengthwise beyond the center rail 26A and have inwardly beveled end edges for redirecting any cups tending to stray outwardly while being fed from the depositor station 23. In case more cups are fed by one belt than by the other so that there is a cup buildup at the row isolating stop 29 of one belt while waiting for the companion belt to complete a three cup row in the accumulator, the continuous movement of the belts 22 causes the excess cups on one belt to seek a new travel path and transfer automatically to the empty belt. The center guide rail 26A extends only about two cup diameters beyond the entrance to the accumulator whereas the outer guide rails extend 5 or 6 cup diameters beyond the accumulator.

A vertical lift cylinder 60 is supported centrally beneath the accumulator and has a piston rod 60R connected to the elevator 33. The elevator 33 has guide rods 61 journaled in an underslung cross brace 62 carried beneath the bed plate of the main frame and normally has its lifting walls 34 slightly beneath the plane of the conveyor belts and arranged in closely flanking position to the belt edges to lift against overhanging portions of the cups in the accumulator.

DEPOSITOR

The bridge frame 48 for supporting the entry end of the superstructure 46 also serves to mount the depositor 23 as shown in FIGS. 7 to 10. The bridge frame has vertical legs 63 that carry a rotatably adjustable top cross bar 64 which is equipped with a stop vane 65 that acts as a trip for controlling simultaneous release of each pair of cups from the depositor. A locator stop 66 extends from one leg to limit the swing travel of a twin chute tilt mechanism that is rockably mounted on the bridge frame to oscillate to andfro in the space that underlies the top vane 65. The bridge frame legs 63 have aligned extensions 67 equipped with mounting bearings 68 serving to mount the tilt mechanism by means of a rock shaft 69 that is arranged immediately above the power takeoff shaft 24.

The twin chute tilt mechanism includes a main U-shaped swing frame 70 having vertical side legs 71 connected by a top crossarm 72. The side legs 71 have lower end lugs 73 that telescope over opposite ends of the rock shaft 69 to key the swing frame 70 for joint movement with the rock shaft. The swing frame carries an adjustable twin chute structure that includes vertical side rods 74 anchored in the rock shaft 69 and having threaded upper end extension sleeves 75 (see FIG. 9) journaled axially thereon and projecting through the top crossarm 72 and terminating in a knurled knob 76. The vertical side rods 74 extend through a lower chute section 77 which is in fixed position thereon and the extension sleeves 75 extend through threaded sockets at opposite ends of an upper chute section 78 which is vertically adjustable therealong. Each extension sleeve 75 is fitted with a sprocket 79 and a horizontal drive chain 80 is trained about the sprockets 79. The top crossarm 72 carries a channel shaped shield 88 to form a housing for the chain 80 which operates so that when either knurled knob 76 is turned both extension sleeves 75 rotate in unison and vary the spacing between the chute sections 77, 78. The lower chute section 77 includes a crossbar carrying a pair of rodlike chute rails 77R for each chute path. Correspondingly, the upper chute section 78 includes a crossbar carrying a pair of rodlike chute rails 78R mating with the rails 77R to define a pair of chutes or transfer hoppers that receive cups from the loader and deposit them in inverted position on the belts 22.

The position of the upper chute 78 is varied by turning either of the knurled knobs 76 to convert the machine for handling different diameter cups. A gauge finger 81 is mounted on the upper chute 78 to register with appropriate gauge lines 81L on the side leg 71 of the swing frame. Each hopper outlet is intercepted by the tip 82T of an overhanging gate arm 82 that seats on the crossbar of the upper chute. The gate arm 82 has a top extension 82E that engages the stop vane 65 during downward swinging movement of the tilt mechanism to allow continued travel to effect retraction of the tip 82T to control the timing of the cup release as shown in FIG. 8. A tension spring 83 normally biases the gate arm 82 to a chute-blocking position. The rocking motion of the tilt frame is effected by an eccentric cam 84 centered on the power takeoff shaft 24 and controlling a roller type cam follower 85 carried on a central bracket 86 that is connected to rotate the rock shaft 69.

ACCUMULATOR

The stop mechanisms 28, 29 and counting finger 30 operating in the bottom region of each storage compartment defined by the accumulator partitions 26, 27 are simultaneously and automatically adjustable when the machine is to be converted for use with cups of different diameter.

As previously noted, the center partition 26 is fixed to the bed plate 21 and the outer partition 27 are located in upstanding relation to move laterally across outboard apron regions 21A of the bed plate in adjusting for larger cup diameters. Each side partition 27 is carried by fore and aft spaced pads 90, 91 that project through the bed plate 21 to ride on laterally adjustable sleeves 92, 93 beneath. A main adjustment shaft 94 (see FIG. 3) is equipped with an outboard hand wheel 94H and extends transversely beneath the bed plate 21 at the entry region to the accumulator and has threaded portions of opposite lead in engagement with the front sleeves 92 to effect simultaneous lateral approach movement of the sleeves for one direction of shaft rotation and simultaneous lateral separating movement of the sleeves for the opposite direction of shaft rotation. A companion slave shaft 95 (see FIG. 4) extends transversely beneath the extreme discharge end of the bed plate and has corresponding threaded portions of opposite lead engageable with the sleeves 93. Each of the shafts 94, 95 is equipped with a sprocket 94S, 95S (see FIG. 3) and a link chain 96 is trained about the sprockets to operate the set of four sleeves 92, 93 in unison and thereby simultaneously position the outer partition walls either closer together or farther apart.

The row forming stop mechanism 28 associated with each belt includes a pair of rodlike arms (see FIG. 4) extending through widened regions of the bed plate slots 53 that flank the marginal edges of the belt. The set of four stop arms 28 are carried from a common transverse crossbar 97 that is spaced beneath the bed plate and that has its opposite ends connected to horizontal slide rods 98 that extend lengthwise within the main frame. The slide rods 98 are supported on slide bearings 99 fastened to the sidewalls of the main frame. As shown in FIGS. 3, 4 and 4A, each slide rod 98 has a horizontal rack element 100 extending in parallel spaced relation thereabove and meshing with a pinion gear 101 carried on a drive shaft 102 that extends between the main frame sidewalls. A geneva type gear 103 is also mounted on the drive shaft 102 and is driven by means of a sprocket 104 that meshes with the lower reach of the link chain 96.

The sprocket 104 is equipped with a pair of symmetrically located drive pins 105 to engage in the slots 103S of the geneva gear 103 to shift the entire subassembly that carries the row forming stops 28. This movement is powered from the hand wheel 94H that controls the lateral positioning of the walls 27. Thus, when the outer partition walls 27 are shifted towards the center partition 26 for close clearance guiding of minimum diameter cups, the stop rods 28 are advanced towards the entry region to the accumulator and when the outer partition walls 27 are shifted away from the center partition 26 for guiding the cups of maximum diameter, the stop rods 28 move further from the entry region to allow for the longer row that is required by large diameter cups.

The pairs of support brackets 54, 55 associated with the movable outer partition walls 27 are arranged to adjust the positions of the row isolating stop mechanisms 29 and the counting fingers 30 simultaneously with the lengthwise adjustment of the row forming stop mechanisms. It should be noted, however, that the row isolating stop mechanisms 29 and counting fingers 30 move laterally with the walls and also move lengthwise relative to the walls.

The lower support bracket 55 which carries the row isolating stop 29 has a horizontal base wall 55H provided with an oblique cam slot 55S that receives a stationary guide stem 110 mounted on the apron region of the main frame and has a horizontally slotted vertical wall 55V in lengthwise lost-motion engagement with the partition wall 27 by a pair of guide pins 111 to move laterally therewith while undergoing lengthwise shifting movement as determined by the oblique slot 55S. Thus, when the partition walls move apart, the lower support bracket 55 moves forwardly as well as outwardly and carries the row isolating stop 29 to a more forwardly advanced position to insure that large diameter cups are blocked at a point short of the lengthwise extremity of the elevator walls.

The upper bracket 54 has a horizontal wall 54H provided with an oppositely inclined oblique cam slot 54S that receives another guide stem 112 provided on the apron and has a horizontally slotted vertical wall engaged on the same pair of guide pins 111 on the partition wall 27. The upper support bracket 54 carries a pivot post 30P that mounts the counting finger 30 which is normally spring biased towards the belt margin to sense each cup entering the accumulator position. The counter finger 30 is arranged to operate a poppet element mounted in a pilot section 56P of the counting valve 56 which includes a booster section 56B arranged axially therebeneath. The entire counting valve assembly 56 is carried by the upper bracket 54 for bodily movement therewith.

As shown in FIG. 2, the outer partition wall 27 carries a gauge finger 27F for registry with an indicator gauge 113 provided on the apron 21A to indicate the correct lateral setting for the partition walls.

A hinged door 114 is provided on each outer partition wall to provide access to the adjacent accumulator storage compartment. Each door is mounted on a horizontal hinge 114H that includes torsion springs 114T normally biasing the door closed. A slide plate 115 is adjustable horizontally along the door and overlaps with a window opening 114W to carry a vertical support hinge 115H for mounting a tier alignment vane along a side region of each accumulator storage compartment. A torsion spring 116T normally biases the tier alignment vane towards an oblique relation and the slide plate 115 is lengthwise adjustable to register the vane 116 with the row forming stop mechanism 28. The slide plate 115 is guided on a dead pin 117 and on a clamping pin 118 projecting through a lengthwise slot 115S therein. Thus, the plate 115 is manually settable to align gauge indicia 115G with a reference mark 114M that assist in coordinating the alignment vane 116 with the row forming stop 28. During discharge of the tiered array, each alignment vane 116 contacts a vertical tier of cups and effects final alignment thereof as the cups move thereby.

The support rails 31, 32 are mounted on horizontal hinges 31H, 32H and are biased by torsion springs 31T, 32T to the oblique positions illustrated in FIG. 4. Outboard limit stops 32S carried by the outer gates 32 determine this position and corresponding stops (not shown) serve to locate the gates 31.

The fixed center partition 26 is provided with lengthwise spaced top lugs 119, each mounting a set of swing links 120 that have lower ends pivotally connected to a floating ski 121 located in the head region of each accumulator chamber. The skis 121 engage the cups of the top row and thereby apply a limited hold down force. The floating parallel link mounting of the skis accommodates the necessary vertical overshoot of the elevator 33 associated with lifting the final row of cups slightly higher than the support rails 31, 32 to allow the same to swing therebeneath. The floating mounting of the skis also accommodates the containers of the various different heights that are to be handled. During discharge of the tiered array, the skis 121 act as a stabilizing rail and assist in maintaining the desired configuration for the array.

PUSHER CARRIAGE

The pusher carriage 40 is slidably mounted on the superstructure by means of the crossbolt 52 that extends through the guide tube 51, connects to the piston rod (not shown) of the pusher cylinder 50 and secures the angle-type side braces 122 assembled in flanking relation to the guide tube 51.

The side braces 122 of the pusher carriage include fixed depending leg portions 122L that carry mounting pivots 123 for swingably mounted lower leg sections 124 that are positioned vertically before and during the pusher stroke, as shown in FIGS. 1 and 3 and that are swung to an elevated horizontal position as shown in FIG. 1A.

An automatic positioning mechanism for the leg section 124 includes an actuating rod 125 pivotally connected to a crank portion 124C thereof and a telescoping load spring 126. A lifting cradle comprises a pair of bell cranks 127 secured in flanking relation to the side braces 122 by a mounting bolt 128 that serves as a common pivot shaft. The upper arms 127U of the bell cranks 127 are connected by a crossbolt 129 and the lower arms 127L are connected to the upper end of the rod 125. The load spring 126 normally acts to pivot the bell cranks clockwise about the axis of the bolt 128 to tend to lift the lower legs 124.

Latches 130 pivotally mounted on a crossbolt 131 are normally biased in a counterclockwise direction by tension springs 132 that are anchored on stub arms 127A on the bell cranks 127. The latches 130 normally engage beneath the mounting bolt 129 to prevent counterclockwise movement of the bell cranks 127 so that the lower leg sections 124 stay vertical as shown in FIGS. 1 and 3.

The pusher cylinder 50 drives the carriage through a full horizontal stroke while the legs 122L and 124 are vertical and engageable with the endmost cups of each row that is supported from the gates 31, 32. A head stop 133 mounted on the remote end of the guide tube 51 includes lug portions 133L aligned with lug portions 130L on the latches to trip the latches 130 at the end of the pusher stroke and allow the load springs 126 to swing the leg sections 124 upwardly as shown in FIG. 1A.

The head stop is fitted with a pair of trip arms 134 that carry a bridge 135 which is to be engaged by the carriage crossbolt 131 at the end of the pusher stroke. The trip arms 134 connect through a horizontal actuating rod mechanism 136 underlying the guide tube 51 to operate a bell crank 137. The bell crank 137 connects to a vertical actuating rod mechanism 138 extending through the bed plate to control a switching valve 139 that initiates reverse operation of the pusher cylinder 50. During the return stroke of the carriage the leg 124 is held upwardly by the action of the spring 126.

A ramp 140 is provided on the top of the guide tube at the start position of the carriage 40. During the final return of the carriage 40, the cross bolt 129 rides upwardly on the ramp 140 to swing the bell crank 127 counterclockwise and return the lower leg 124 to vertical position. At the same time, the tension springs 132 move the latches 130 into supporting engagement beneath the crossbolt 129 to hold the legs 124 down until the end of the succeeding pusher stroke.

CONTROL SYSTEM

A schematic diagram of the pneumatic control circuit for sequencing the operation of the counter mechanisms 36 and the row isolating stop 29 with the elevator 33 and the pusher carriage 40 is shown complete for only one belt in FIG. 13. It may be noted that this circuit includes the counting valve 56 and counting finger 30 carried by the upper bracket 54 of FIG. 2; the row isolating stop 29 and stop valve assembly 57 carried by the lower bracket 55 of FIG. 2; the elevator 33, elevator lift cylinder 60 and elevator return valve 141 of FIG. 4; the pusher carriage 40, pusher cylinder 50 and return valve 139 of FIG. 3; and the counter mechanism contained in the control module of FIGS. 11 and 12.

Except for the elevator and pusher units, a duplicator set of control elements are provided for the other belt, but for simplicity, the duplicate elements, with the exception of the companion counter pilot valve 37, are omitted from the diagram shown in FIG. 13. It will be recalled that the elevator 33 is not operated until each row of three cups has been accumulated and counted. Separate counter mechanisms 36 for each belt are mounted in a control module M as shown in FIGS. 11 and 12 to be actuated by separate counting cylinders 142 and to control the series-connected counter pilot valves 37 shown in the schematic diagram of FIG. 13. The counter pilot valves 37 control application of air to a reversible elevator control valve 143 thereby providing the interlocking function which prevents operation of the elevator cylinder 60 until both rows of these cups are completed. Each counter mechanism 36 actuates a stop pilot valve 144 which then actuates the stop control valve 57 to trigger the row isolating stop 29 and prevent any additional cups from entering the accumulator. The counting valve 56 in also temporarily disabled so that the counter mechanisms 36 can not be further actuated, thus defining an intermediate rest condition.

A sequencing mechanism 145 is located symmetrically to the counter mechanisms 36 to shift the same beyond the intermediate rest position during the return of the elevator. An actuating cylinder 146 is provided in the control module M for the sequencing mechanism and is controlled by the elevator return valve 141 which operates at the top of the elevator stroke.

Each counter mechanism 36 has a main pivot shaft 147 mounted on the main wall 148 of the control module and carrying a ganged set of three control elements comprising a row isolating cam 149, a totalizing counting ratchet 150 and a sequencing cam 151. Each counting ratchet 150 has 12 teeth, one for each cup to be counted on the corresponding belt and it is arranged to be advanced one position by each stroke of a pivoted pawl 152 that is engaged by the end of the piston rod 142R for the counting cylinder 142. The row isolating cam 149 has uniformly spaced cam rests 149R located at every third step. Each row isolating cam 149 has a pair of switch arms 37A, 144A engageable therewith to control the valves 37, 144 simultaneously. The sequencing cam 151 has four lugs or ears 151L corresponding to the four cam rests 149R and it is to be engaged by the sequencing mechanism 145 to step both counter mechanisms 36 beyond the intermediate positions determined by the cam rests.

The sequencing mechanism 145 is symmetrical and includes a reciprocating drive link 153 attached to the piston rod 146R of the sequencing cylinder 146, the drive link having a floating pivot connection 147 to a matching pair of bell cranks 154. Each bell crank 154 has a fixed pivot 155 to a base plate 156 which is affixed to the main wall 148 and carries the sequencing mechanism as an entire subassembly. A pair of upstanding guide pins 157 are carried by the base plate 156 to flank the drive link 153. A set of transverse push bars 158, 159 are provided for stepping the sequencing cam 151 beyond the intermediate rest position and have straight guide slots to embrace the guide pins 157 for defining transverse travel paths for the push bars 158, 159. The upper bell crank 154 has a floating pivot connection 160 to an extension portion 158E at the top of the push bar 158 and the lower bell crank 154 has a floating pivot connection 161 to an extension portion 159E at the bottom of the push bar 159.

The push bars 158, 159 thus have a lost-motion mounting relationship upon the fixed base plate 156 to accommodate both transverse and swivel motion. Each push bar is to be moved transversely or endwise against an ear 151L on the corresponding sequencing cam 151 to advance both counter mechanisms beyond the cam rest position. During subsequent rotation of the counter mechanisms in connection with counting the cups being accumulated in the next row, the succeeding ear 151L on each sequencing cam 151 deflects each push bar is a swivel fashion causing temporary misalignment thereof. A pair of bell cranks 162 are journaled on fixed pivots 163 that closely flank the drive link 153 adjacent the front of the base plate 156. A tension spring 164 engages adjacent arms of the bell cranks 162 and normally biases the free arm of each bell crank in a direction to yieldingly resist swivel movement of the push arms so as to automatically restore the desired alignment following the sweep of each ear.

OPERATION

The counting and interlocking operation of the control system for the two-belt packaging system disclosed herein is now described with particular reference to FIGS. 11, 13 and 14. Air is normally supplied from a constant pressure source S to the booster section 56B of each counting valve 56; to the reversible control valve 143, 170 for the elevator and the push cylinders 60, 50, respectively; to the return valves, 141, 139, respectively, for the elevator and the push cylinders, and to the pilot valves 37, 40, 144 that are associated with the counter mechanisms 36.

When a passing cup actuates the counter finger 30 to trigger the pilot section 56P of the counting valve, the booster section 56B opens to apply a pulse of compressed air along the line 171 that connects to one end of the counting cylinder 142. The counting cylinder 142 triggers the counting pawl 152 to advance the ratchet 150 one tooth pitch and rotate the entire counter assembly one-twelfth of a revolution. After three cups have been counted, the entire counter assembly will have advanced three-twelfths of a revolution and the rest portions 149R on the sequencing cam 149 lift and hold the switch arms 37A, 144A for the pilot valves.

The pilot valve 144 for the row isolating stop 29 is opened by one cam rest to apply air through a line 172 to an actuating cylinder 173 mounted on the stop valve 57 to throw the row isolating stop 29 inwardly into position to intercept and block movement of the fourth cup. A slave valve 174 associated with the stop valve 57 is also opened to relieve the air pressure in the booster section 56B of the counting valve and temporarily prevent further actuation of the counting mechanism 36.

The row interlocking pilot valve 37, shown in full lines in FIG. 13, is opened simultaneously by the other cam rest 149R to apply air to the elevator control valve 143 when the companion pilot valve 37, shown in dotted lines in FIG. 13, is opened by the companion counter assembly 36. Normally, both rows of cups are being accumulated and counted at the same time and both counter assemblies 36 reach a three count at about the same time. The interlocking function of the series connected pilot valves provides automatic synchronization and insures that both rows are full at the time the elevator is operated.

The elevator control valve 143 provides for two way control of the elevator lift cylinder 60. When the interlocking pilot valves 37 both operate, the elevator control valve 143 applies compressed air over the line 175 to the closed lower end of the lift cylinder 60 while exhausting from the top or rod end thereof, and the elevator rises full stroke until a limit stop 61L carried at the lower end of its guide rod 61 trips the sense arm 141A of the return valve 141 and operates a pilot valve 143P in the elevator control valve 143 to reverse the air connections and supply compressed air over line 176 to cause rapid return of the elevator. As the elevator returns, the underneath lifting support of the elevated rows of cups is transferred to the support gates 31, 32 which have automatically swung inwardly therebeneath.

The return pilot valve 141 is also connected to energized the actuating cylinder 146 (see FIG. 11) for the sequencing mechanism 145 while the elevator is at the top of its stroke.

The drive link 153 of the sequencing mechanism acts through the bell cranks 154 and push bars 158, 159 to engage the reset ears 151L on the sequencing cam 151 and shift both counter assemblies beyond the intermediate rest position. The pilot valves 144 controlled by the row isolating cam 149 are permitted to close and the row isolating stop 29 is restored by the actuating cylinder 173 associated with its control valve 57 while the slave valve 174 is restored to free the counting valve 56.

Resetting of these row controls is accomplished while the elevator is returning so that additional cups are immediately able to enter and be counted in the accumulator compartments until a second set of rows are accumulated and counted in the same fashion as before. At this point, both counting ratchets 149 will have advanced the counting assemblies six-twelfths of a revolution and the cam rests 149R are again holding the pilot valves 37, 144 open to reactuate the row isolating stop 29 and disable the counting valve 56 while the elevator 33 executes its lift stroke. During the second lift stroke, the second rows of cups pick up the first rows of cups in tiered relationship and the support gates 31, 32 swing outwardly to admit the second rows of cups and then swing inwardly to provide support beneath the cups of the second row when the elevator is subsequently returned.

Once again, the elevator return switch 141 triggers the actuating cylinder 146 for the sequencing mechanism 145 to advance the counter assemblies 36 beyond the cam rest position. The third and fourth rows of cups are accumulated, counted and elevated in the same fashion until the counting ratchet has advanced 12 steps (on full revolution). When the elevator 33 is lifting the fourth row of cups, the counter mechanisms are again at the cam rest position and are advanced from this position by the action of the elevator return switch 141 which operates the actuating cylinder 146 of the sequencing mechanism at the top of the fourth lift stroke.

As the first cycle of counting is completed, a trip cam 177 carried in upstanding relation on the sequencing cam 151 comes against the switch arm 40A of a pilot valve 40 for the pusher control valve 140. The pilot valve 40 is tripped by the action of the sequencing mechanism 145 when it advances the counter assemblies 36 beyond the fourth cam rest position. The pusher control valve 170 then energizes the pusher cylinder 50 to advance the pusher carriage through a discharge stroke. The return of the elevator has already transferred support of the four tier set of rows to the support gates 31, 32, with the skis 121 seating in guiding relation on the top row of cups at the time that the pusher carriage advances the array.

The pusher legs 122L, 124 advance the rows endwise past the guide vane 116 which acts to align the vertical tiers immediately prior to transfer from the support rails 31, 32 to the elevated extension shelves 41. A packing box B which has previously been positioned on the extension shelves has a bottom flap F in position to be clamped by a pivotally mounted friction brake under the control of a brake lift cylinder 178 which is also operated by the pusher control valve 170.

The pusher stroke is of a length to fully seat the 24 cup array in the box and to effect discharge of the filled box along the inclined transfer ramp 43 provided outboard at the discharge end of the machine.

At the end of the pusher stroke, the latches 130 on each side of the pusher carriage come against stop lugs 133L on the end of the superstructure to allow the load springs 126 to swing the lower pusher legs 124 upwardly to provide vertical clearance for cups which are already being accumulated for the next array. The pusher carriage also trips a reset mechanism 136 that actuates the pusher return valve 139 located beneath the bed plate. The pusher return valve 139 reverses the pilot section 170P of the pusher control valve 170 to energize the pusher cylinder 50 in a sense to retract the pusher carriage and also releases the box brake cylinder 178. When the return stroke is completed, the crossbar 129 on the pusher carriage is lifted by the ramp 140 on the superstructure to return the pusher legs 124 to vertical position.

Where fragile articles or articles such as glassware which may telescope are to be packaged, filler strips can be introduced to serve as separators between the rows. In FIG. 3, a hopper 200 for storing a stack of filler strips 201 and a push plate 202 is shown discharging the bottom filler strip 201 to position it on top of the articles in the row that is being accumulated. The filler strips 201 are introduced during the row accumulation by means of a control valve 203 (FIG. 13) located on step pitch in advance of the valves 37 to 144 to respond to the cam rests 149 before the row is complete and elevated. The valve 203 actuates a pneumatic cylinder (not shown) that drives the plate through its ejecting stroke. The filler strips 201 are of less width than the articles to fit between the gates 31, 32 when the same are in oblique relation.

In the present description, the boxes are shown already in position on the shelves 41. The boxes may be stored in flat form in an elevated hopper 204 to be unfolded and placed in position manually. The invention contemplates an automatic box handling mechanism located, for example, as indicated at 205 in FIG. 1 and serving to feed boxes automatically to embrace the shelves 41 and thereafter serving to discharge the filled boxes along a transverse conveyor 206 where the boxes are folded, sealed and transferred for shipment or storage. The containers for receiving the array of 24 cups may be conventional paper bags which can be applied over the support shelves 41 and held in place thereon in the same general fashion as is illustrated for the box B in FIG. 3.

Thus, while preferred constructional features of the invention are embodied in the structure illustrated herein, it is to be understood that changes and variations may be made by those skilled in the art without departing from the spirit and scope of the appended claims.

What is claimed is:

1. An article depositing apparatus comprising a support frame, a tilt mechanism journaled on said support frame and having a chute to receive an article through one end and to discharge the article through an opposite end, said chute being defined by upper and lower chute sections, adjustable means for setting the spacing of said chute sections, a gate movably mounted on said tilt mechanism normally to block said opposite end of said chute, means to rock said tilt mechanism to and fro to receive an article at one position and discharge an article at a different position, and stop means mounted on said support frame and engageable with said gate to retract the same during rocking movement of said tilt mechanism.

2. An article depositing apparatus comprising a support frame, a tilt mechanism journaled on said support frame, said tilt mechanism including spaced apart upper and lower chute sections cooperatively defining side-by-side chutes each adapted to receive an article through one end and to discharge the article through an opposite end, a separate gate pivotally mounted on said tilt mechanism normally to block said opposite end of said chute sections, means to rock said tilt mechanism to and fro to receive an article at one position and discharge an article at a different position, stop means mounted on said support frame and engageable with said gates to retract the same during rocking movement of said tilt mechanism, said stop means comprising a rotatably mounted vane for engagement with both said gates and selectively adjustable to set the point of engagement therewith, and adjustable means for setting the spacing of said chute sections to regulate the size of both chutes simultaneously.

3. An article depositing apparatus comprising a support frame, a tilt mechanism journaled on said support frame and having a chute to receive an article through one end and to discharge the article through an opposite end, said tilt mechanism including an inverted U-shaped swing frame having spaced legs pivotally mounted on said support frame, a gate movably mounted on said tilt mechanism normally to block said opposite end of said chute, means to rock said tilt mechanism to and fro to receive an article at one position and discharge an article at a different position, said last named means including a rotatably mounted cam engaging a cam follower mounted on one leg of said swing frame, and stop means mounted on support frame and engageable with said gate to retract the same during rocking movement of said tilt mechanism.

4. An article depositing apparatus comprising a support frame, a tilt mechanism journaled on said support frame and having a chute to receive an article through one end and to discharge the article through an opposite end, a gate movable mounted on said tilt mechanism normally to block said opposite end of said chute, means to rock said tilt mechanism to and fro to receive an article at one position and discharge an article at a different position, and stop means mounted on said support frame and engageable with said gate to retract the same during rocking movement of said tilt mechanism, said gate being defined by an arm having its midportion pivotally mounted on said tilt mechanism and having a first end normally positioned to overhang said chute to block the opposite end thereof and a second end positioned to engage said stop means for pivoting said arm to retract the first end thereof to a clearance position.

5. An article dispensing apparatus in accordance with claim 4 and in which spring means biases said arm to the position where the first end thereof overhangs the chute.

6. An article dispensing apparatus in accordance with claim 5 and in which said stop means is rotatably mounted on said support frame, whereby the point of engagement between the second end of said arm and said stop means can be selectively adjusted.

7. An article depositing apparatus comprising a support frame, a tilt mechanism journaled on said support frame and having a chute to receive an article through one end and to discharge the article through an opposite end, said chute being defined by spaced article supporting members, means for adjusting said article supporting members whereby different size articles can be accommodated, a gate movably mounted on said tilt mechanism normally to block said opposite end of said chute, means to rock said tilt mechanism to and fro to receive an article at one position and discharge an article at a different position, and stop means mounted on said support frame and engageable with said gate to retract the same during rocking movement of said tilt mechanism.

UNITED STATES PATENT OFFICE
CERTIFICATE OF CORRECTION

Patent No. 3,616,967                    Dated November 2, 1971

Inventor(s) MARTIN MUELLER and BERNARD ZURHOEFER

It is certified that error appears in the above-identified patent and that said Letters Patent are hereby corrected as shown below:

Column 1, line 63, "load" should be -- lead --.

Column 3, line 14, "scaled" should be -- sealed --.

Column 3, line 42, "vent" should be -- event --.

Column 5, line 8, "depositer" should be -- depositor --.

Column 6, line 66, "88" should be -- 81 --.

Column 10, line 8, "duplicator" should be -- duplicate --.

Column 13, line 23, "scaled" should be -- sealed --.

Column 14, line 18, after "on" add -- said --.

Column 14, line 48, "sald" should be -- said --.

Signed and sealed this 2nd day of May 1972.

(SEAL)
Attest:

EDWARD M. FLETCHER, JR.                ROBERT GOTTSCHALK
Attesting Officer                      Commissioner of Patents